Feb. 24, 1953 L. WENGER 2,629,351
LISTER
Filed Nov. 13, 1946 3 Sheets-Sheet 2

INVENTOR,
Lee Wenger,
BY
Roy E. Hamilton,
Attorney.

INVENTOR,
Lee Wenger.
BY Roy E. Hamilton,
Attorney

Patented Feb. 24, 1953

2,629,351

UNITED STATES PATENT OFFICE 2,629,351

LISTER

Lee Wenger, Morrill, Kans.

Application November 13, 1946, Serial No. 709,560

1 Claim. (Cl. 111—60)

This invention relates to new and useful improvements in lister or planting machines, and has particular reference to listers wherein the plowing and the planting structures are combined in a single structural unit.

An important object of this invention is the provision of a means operable whenever the lister share strikes a rock or other obstruction whereby the seed cans are caused to pivot out of the path of the break beam carrying said share.

Further objects are simplicity and economy of construction, and adaptability for use as a two, three, or four row lister.

With these objects in view, as well as further objects which will become apparent during the course of the specification, reference will be had to the drawings, wherein:

Fig. 9 is an enlarged fragmentary horizontal section taken on line IX—IX of Figure 2.

Figure 1:
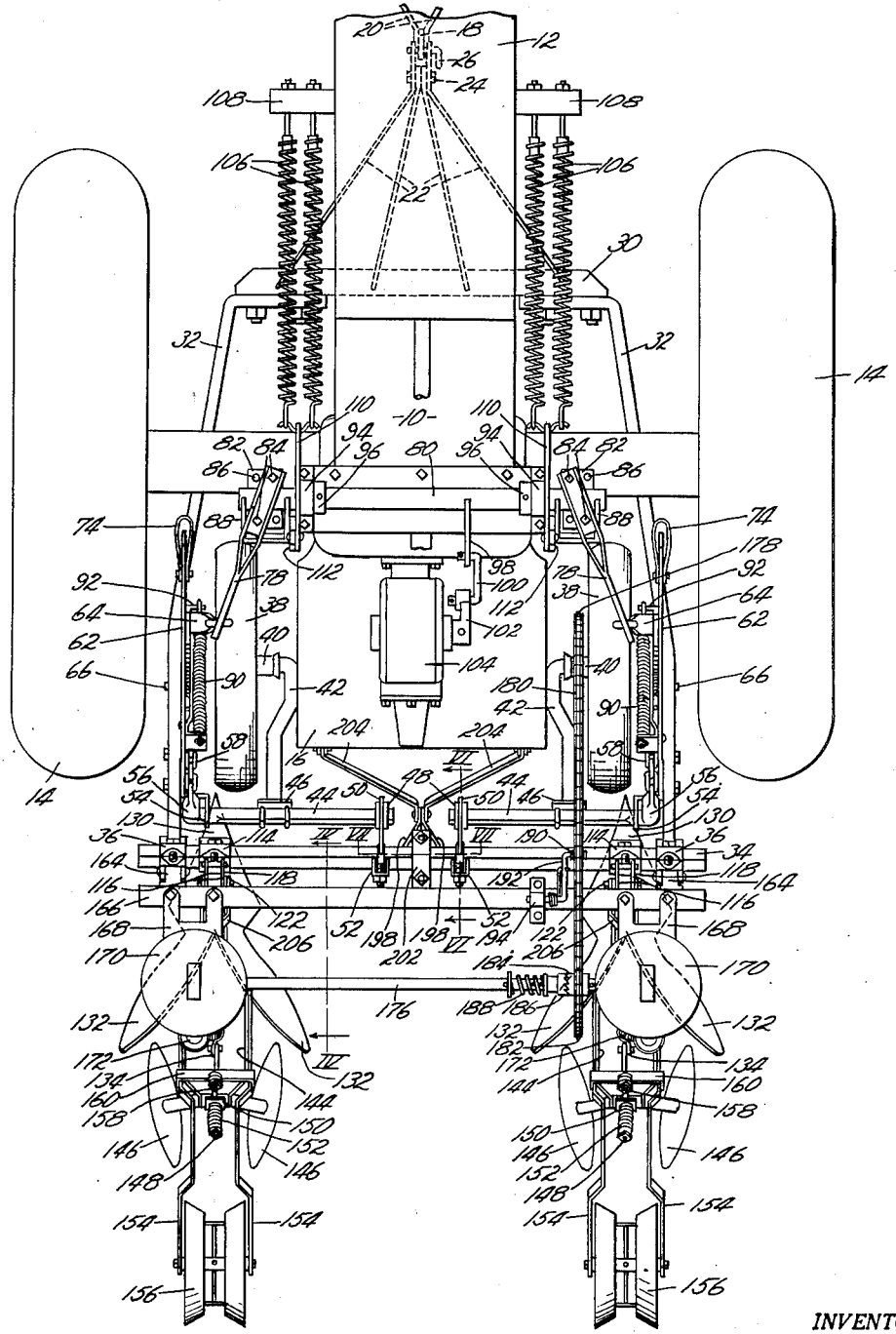
Figure 1 is a plan view of a lister attachment embodying the present invention, disposed in operative relationship to a tractor.

Like reference numerals apply to similar parts throughout the several views, and the numeral 10 refers to a fragmentary showing of a tractor having a frame 12, rear wheels 14, and a step 16 attached to the rearward end of said frame.

Rigidly attached underneath frame 12 at a point intermediate the forward and rearward ends thereof is a hitching member 18, the lower end of said member being braced by rods 20 rigidly attached at one end to said hitching member and at their opposite ends to frame 12.

A plurality of pulling members 22, rigidly connected at a point adjacent their forward ends by bolt 24 and extending rearwardly divergently, are pivotally connected at their forward ends to member 18 by means of hitching pin 26, which passes through certain of said pulling members and through any of a plurality of vertically spaced holes 28 provided therefor in member 18. To the rearward ends of pulling members 22 is rigidly attached a horizontal drawbar 30. Rigidly attached to the ends of said drawbar are main frame members 32, which extend rearwardly to a point behind wheels 14. The rearward ends of said frame members are removably attached to tool bar 34 by means of clamps 36.

The rearward ends of frame members 32 are supported at an adjustable distance above the ground by means of a pair of ground engaging gauge wheels 38, which are carried in spaced apart relationship between said frame members at a point forward of tool bar 34. The axle 40 of each of said wheels is rotatably mounted at the end of a rod 42 which extends from the inner end of said axle, and at substantially right angles thereto, to a squared shaft 44 parallel to and immediately forward of tool bar 34, said rod being rigidly attached to said shaft by means of clamp 46. The inner ends of shafts 44 are carried in square holes provided therefor in flanged bushings 48, which are rotatably carried by bearing members 50, said bearing members being rigidly connected to tool bar 34 by means of clamps 52. The outer ends of shafts 44 are rounded and are rotatably carried in bearing brackets 54 rigidly fixed to frame members 32. The ends of shafts 44 extending outwardly beyond said brackets are bent upwardly at right angles to said shafts to form lever arms 56.

Figure 2:
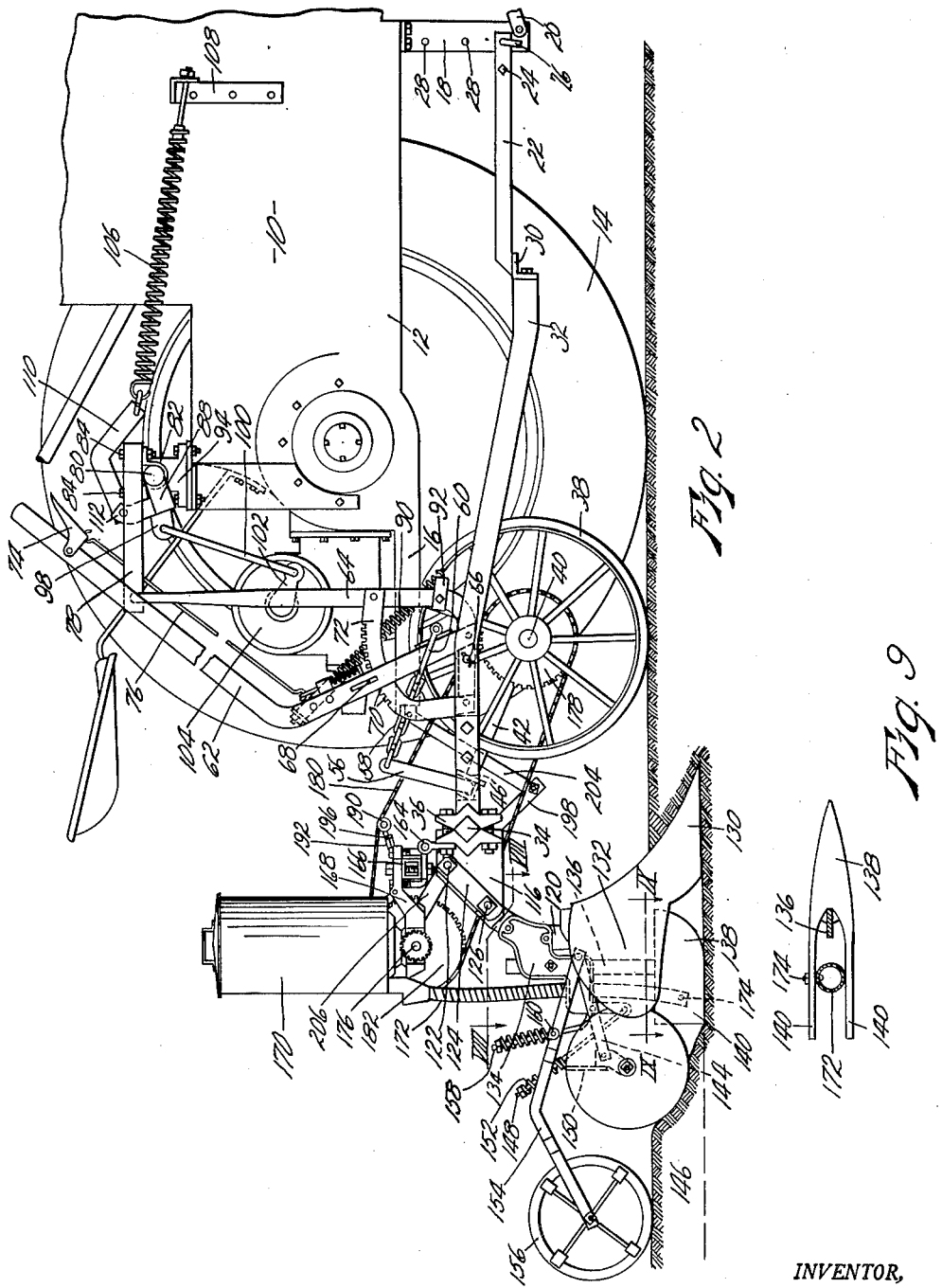
Fig. 2 is a side elevation of the lister attachment disposed in operative relationship with the ground and with a tractor, with one of the tractor wheels removed.

A pair of chains 58, which are attached respectively to the upwardly extending ends of lever arms 56, are attached respectively at their opposite ends to a clevis 60 pivotally attached to depth setting lever 62 at a point adjacent the lower end thereof. Said depth setting lever is pivotally attached at its lower end to L-shaped lifting member 64 at a point adjacent the angle thereof, as shown in Figure 2. Said lifting member is pivotally connected to frame member 32 by means of pin 66, but is normally held stationary with respect to frame member 32 by means hereinafter described. Depth setting lever 62 is held at any desired angle with respect to said lifting member by the engagement of a spring loaded detent 68, associated with said lever, in any one of a plurality of notches 70 provided therefor in an arcuate member 72 having its respective ends rigidly attached to lifting member 64 at points on opposite sides of the pivot point of depth setting handle 62. Said detent may be engaged in or released from said notches by the manual operation of lever 74 pivotally attached to depth setting lever 62 adjacent the upper end thereof, lever 74 being operatively connected with detent 68 by means of rod 76. Thus, it will be seen that when depth setting levers 62 are manually moved forwardly, they will, through clevis 60, chains 58, levers 56, shafts 44, and rods 42, cause wheels 38 to be urged against the ground, thus raising tool bar 34 with respect to the ground and adjusting the depth of cut of the plow carried by said tool bar. The forward movement of levers 62 is assisted by tension springs 90, one end of each of which is attached to said lever at a point above detent 68, and the opposite end of which is attached to lifting member 64 by means of bracket 92.

The upwardly extending arms of lifting members 64 are pivotally connected at their upper ends to the rearwardly extending ends of levers 78, the forward ends of said levers being pivotally attached to shaft 80 by clamp bearings 82, which are firmly attached to levers 78 by means of bolts 84, and which encircle shaft 80 at points adjacent the ends thereof. Alternate holes 86 are provided in clamp bearings 82 for bolts 84 in order that lever 78 may be positioned at various angles with respect to shaft 80. Levers 78 are caused to turn with shaft 80 when it rotates in a forward direction by means of U-shaped brackets 88, the free ends of each of said brackets being welded to shaft 80 astraddle the associated clamp bearing 82 and the rearwardly extending closed end of said bracket adapted to contact lever 78 at a point intermediate its ends.

Shaft 80 is carried for rotation in bearings 94, which are carried by tractor frame 12 in spaced relationship between U-brackets 88, and longitudinal movement of said shaft through said bearings is prevented by stop collars 96. A lever arm 98, rigidly fixed to shaft 80 intermediate bearings 94 is operatively connected by link 100 with crank 102, mounted on the shaft of tractor power take-off 104. Thus when crank 102 is turned through a partial revolution by said power take-off, it will through link 100, lever 98, shaft 80, lever 78, and lifting member 64, cause the rearward end of the main frame 32 and all parts carried thereby, including gauge wheels 38, to be lifted free of the ground preparatory to turning the tractor. A pair of tension springs 106 positioned on each side of the tractor, the forward ends of which are attached to tractor frame 12 by means of brackets 108, and the rearward ends of which are connected by angled link 110 with the upper end of a lever 112 which is rigidly connected at its lower end with the rearward end of bracket 88, serve to assist power take-off 104 to lift the lister frame.

Figures 4, 5:
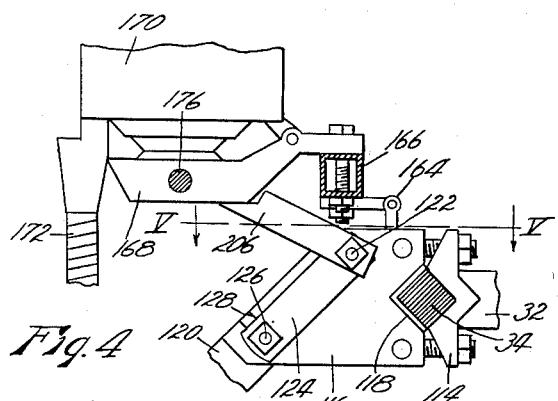
Fig. 4 is an enlarged fragmentary vertical section taken on line IV—IV of Figure 1.
Fig. 5 is a horizontal section taken on line V—V of Figure 4.
Figure 6:
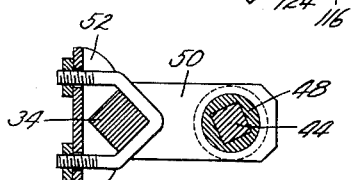
Fig. 6 is an enlarged fragmentary vertical section taken on line VI—VI of Figure 1.

Mounted on tool bar 34 by means of clamps 114 are a plurality of break beam mounting devices comprising a pair of parallel plates 116 rigidly attached to clamp plate 118. A break beam 120 is pivoted between said parallel plates by means of pivot bolt 122 which passes through said plates and said beam. Also included on said pivot bolt are two friction pieces 124 which are clamped by said bolt against the outer surfaces of plates 116, as shown in Figure 5. Passing through said break beam at a point spaced apart from pivot bolt 122 is a clamp bolt 126, said bolt also passing through friction pieces 124 and through slots 128 in plates 116. Said clamp bolt is drawn up sufficiently tight normally to maintain break beam 120 rigid with respect to plates 116, and prevent pivoting thereof on bolt 122.

Rigidly attached to the lower end of each of said break beams is a plow member comprising a share section 130 and moldboard section 132. Securely fixed to each of said break beams at a point intermediate said plow member and plates 116 is a bracket 134 extending rearwardly from said break beam. Fixed in said bracket immediately behind said break beam is a vertical bar 136 to the lower end of which is fixed a furrow opener 138 which comes to a sharp edge at its forward end and which has rearwardly extending parallel side walls 140.

On bosses 142 of bracket 134 is pivotally mounted a frame 144 at the rearward end of which are rotatably mounted a pair of discs 146 adapted to fill the furrow opened by share 130. A rod 148 pivotally attached at its lower end to bracket 134 and extending upwardly through extension 150 of frame 144, retains on its extended end a spring 152 by means of which discs 146 are normally urged downwardly against the ground. Bosses 142 of bracket 134 also carry a pivotally mounted frame 154 extending rearwardly to a point behind discs 146, which carries at its rearward end a rotatably mounted press wheel 156 adapted to pack the earth in the furrow filled by discs 146. A rod 158, pivotally connected at its lower end to bracket 134 and extending upwardly through member 160 of frame 154, retains on its extended end a spring 162 by means of which press wheel 156 is urged against the ground.

Pivotally connected to clamps 36 by means of hinges 164 is a bar 166 on which are firmly fixed seed can bases 168 carrying seed cans 170, each of said cans being carried substantially above a break beam 120. To each seed can is attached a flexible feed tube 172 extending essentially vertically downwardly from said can through a hole provided therefor in bracket 134 and attached at its lower end between side walls 140 of furrow opener 138 by means of bolt 174, as shown in Figure 9.

Rotatably carried by seed can bases 168 and extending therebetween is a shaft 176 adapted to actuate mechanism contained within said seed can bases and seed cans whereby seeds contained within said seed cans are periodically discharged therefrom into feed tubes 172. A sprocket 178 rigidly attached to the hub 40 of the right hand gauge wheel 38 is operatively connected by means of chain 180 with sprocket 182 mounted for rotation on shaft 176. The hub 184 of sprocket 182 is notched at one end to engage a notched clutch member 186 splined to shaft 176 and urged against hub 184 by spring 188 retained on shaft 176. The engaging notches of clutch member 186 and hub 184 are so formed that as long as the lister is pulled in a forward direction, sprocket 182 will be operatively engaged with shaft 176. However, if the lister is backed, clutch member 186 will be forced out of engagement with hub 184 and sprocket 182 will turn freely on shaft 176. This provision is made to prevent damage to the feed mechanism contained within seed cans 170 which would be caused if the operation of said mechanism were reversed. Chain 180 is maintained taut by means of an idler roller 190 rotatably carried at the free end of an arm 192 pivotally connected to bar 166 by means of bearing bracket 194, said arm being constantly urged toward the upper reach of chain 180 by spring 196.

Figure 7:
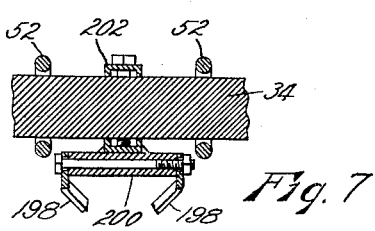
Fig. 7 is an enlarged fragmentary vertical section taken on line VII—VII of Figure 1.
Figure 8:
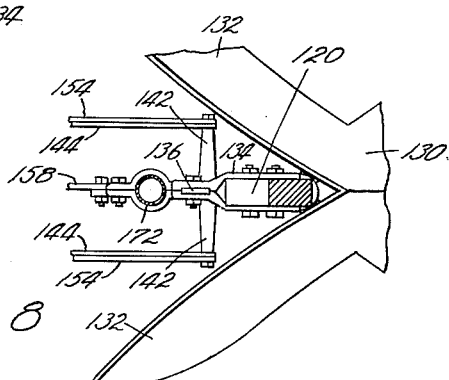
Fig. 8 is an enlarged fragmentary horizontal section taken on line VIII—VIII of Figure 2.

Two links 198 pivotally connected to the opposite ends of bearing block 200 fixed to tool bar 34 by clamps 202, as shown in Figure 7, converge forwardly and are pivotally connected at their forward ends to two links 204, the last named links being forwardly divergent and the forward ends thereof pivotally attached to tractor step 16. The stabilizing linkage comprising links 198 and 204 will cause the lister to run in a straighter line by preventing the lateral movement of tool bar 34 with respect to the line of travel of the tractor.

Each seed can base 168 is supported normally in a substantially horizontal position by means of a supporting arm 206, one end of said arm being rigidly attached to a friction piece 124 of the associated friction break beam 120, and the opposite end forming a supporting surface on which seed can base 168 rests, as shown in Figure 4.

Figure 2 shows the lister in operative position, share 130 having been adjusted to the proper depth of cut by depth setting levers 62 as previously described. As tractor 10 moves forward drawing the lister, gauge wheel 38 will, through sprocket 178, chain 180, sprocket 182, and shaft 76, operate the feed mechanism contained within seed cans 170 and cause seeds contained therein to be discharged therefrom at spaced intervals into flexible feed tube 172. The seed is conducted thereby to furrow opener 138 and is deposited in the ground therethrough. Said furrow opener is positioned immediately behind share 130 and forces aside any loose earth which falls into the furrow cut thereby. Discs 146, positioned immediately behind said furrow opened, fill said furrow wiht loose earth, and press wheel 156 positioned immediately behind said discs, will pack said loose earth into the furrow.

Figure 3:
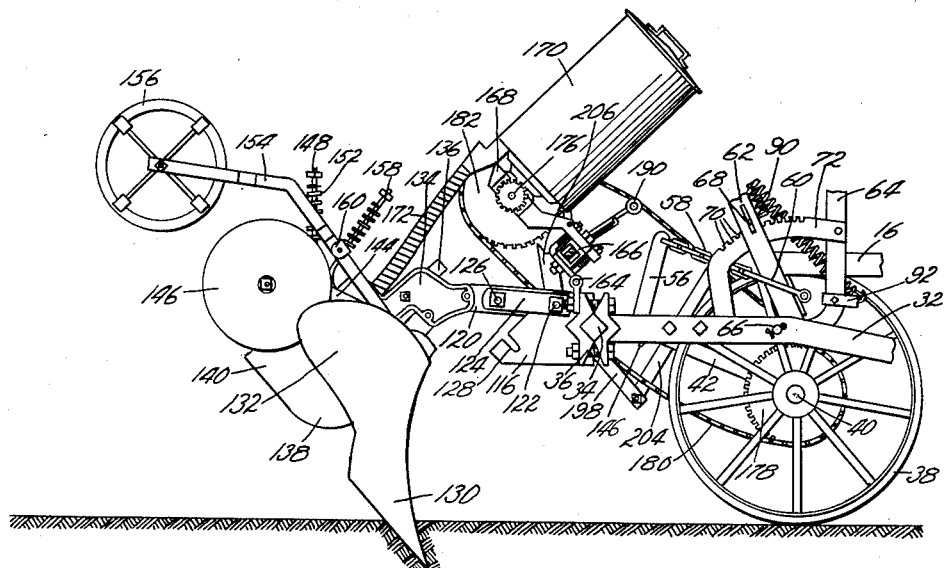
Fig. 3 is a fragmentary side elevation of the lister attachment showing the position assumed by the parts when the lister share strikes a rock or other obstruction.

However, when share 130 strikes a stone or other obstruction clamp bolt 126 will be forced out of slots 128 in plates 116, and break beam 120 and all parts carried thereby will be pivoted rearwardly and upwardly about pivot bolt 122 as shown in Figure 3. If seed cans 170 and their supporting parts were rigid, they would of course, be damaged since they lie in the path of said break beam. But, since support arm 206 is raised by the movement of said break beam, seed can bases 168 and seed cans 170 are simultaneously pivoted upwardly on hinges 164. When seed can base 168 has been raised a short distance, support arm 206 will no longer be long enough to support said seed can base, since the two parts are pivoted about different centers. However, at this time the upper edge of the support arm will have come into contact with bar 166, and further movement of the support arm will continue to cause said bar and said seed can bases to be pivoted on hinges 164. The parts will then have the relative position shown in Figure 3. The lister may be readied for further operation simply by backing the tractor until clamp bolt 126 is engaged in slots 128, and tightening said bolt.

Since the present invention provides a lister wherein the seed cans and related supporting and driving parts are combined in a single unit, it is apparent that a very considerable saving of time and labor required to attach the lister to a tractor is effected over those listers wherein the seed cans and related parts must be attached to the tractor as separate units. It is also apparent that the lister could be adapted for use as a three or four row lister, and that many other minor changes of structure could be made without departing from the spirit of the present invention.

The improvements I claim as new and desire to protect by Letters Patent are:

In a planter of the type described, an elongated frame, a downwardly extending beam pivoted at its upper end to said frame to swing about a transverse axis, a plow fixed to the lower end of said beam, means normally holding said beam in fixed relation to said frame but permitting swinging movement of said beam in a path extending rearwardly and upwardly when excessive pressure is exerted on said plow by an obstruction in its line of travel, a seed can normally disposed above said plow in the path of swinging movement of said beam and pivoted to said frame to swing about a transverse axis forwardly of said seed can, said transverse axes being generally parallel and fairly close together, an arm fixed at one end to said beam and having a free end under said seed can, said seed can resting on and supported by said free end of said arm, means to feed seed from the seed can, a flexible tube connected at its upper end to the seed can and at its lower end to the plow for conducting seed from the seed can to the furrow formed by the plow, whereby when said beam is caused to move rearwardly and upwardly by excessive pressure exerted on said plow said seed can is also caused to move upwardly to prevent striking of the seed can by said beam and avoid undue distortion of said tube.

LEE WENGER.

REFERENCES CITED

The following references are of record in the file of this patent:

UNITED STATES PATENTS

| Number | Name | Date |
| --- | --- | --- |
| 419,563 | Rupp | Jan. 14, 1890 |
| 435,249 | Rush | Aug. 26, 1890 |
| 1,073,759 | Huck | Sept. 23, 1913 |
| 1,078,871 | Olson | Nov. 18, 1913 |
| 1,100,313 | Leischner | June 16, 1914 |
| 1,113,431 | Groupe | Oct. 13, 1914 |
| 1,331,424 | Fanberg | Feb. 17, 1920 |
| 1,453,553 | Gallagher | May 1, 1923 |
| 1,946,685 | Graham | Feb. 13, 1934 |
| 1,978,874 | White et al. | Oct. 30, 1934 |
| 2,024,778 | Ray | Dec. 17, 1935 |
| 2,061,348 | Cogdill | Nov. 17, 1936 |
| 2,097,678 | Strandlund | Nov. 2, 1937 |
| 2,144,347 | Silver | Jan. 17, 1939 |
| 2,171,031 | Graham et al. | Aug. 29, 1939 |
| 2,194,202 | Graham | Mar. 19, 1940 |
| 2,217,866 | Hipple | Oct. 15, 1940 |
| 2,323,278 | Silver | June 29, 1943 |
| 2,347,091 | Elliott | Apr. 18, 1944 |
| 2,351,078 | Silver | June 13, 1944 |
| 2,426,529 | Silver | Aug. 26, 1947 |